(12) United States Patent
Chang et al.

(10) Patent No.: US 8,379,980 B2
(45) Date of Patent: Feb. 19, 2013

(54) SYSTEM, METHOD AND COMPUTER PROGRAM PRODUCT FOR DOCUMENT IMAGE ANALYSIS USING FEATURE EXTRACTION FUNCTIONS

(75) Inventors: Yuh-Lin E. Chang, Fremont, CA (US); Stewart N. Taylor, Los Altos, CA (US); Michael F. Fallon, Tiverton, RI (US)

(73) Assignee: Intel Corporation, Santa Clara, CA (US)

( * ) Notice: Subject to any disclaimer, the term of this patent is extended or adjusted under 35 U.S.C. 154(b) by 123 days.

(21) Appl. No.: 13/071,999

(22) Filed: Mar. 25, 2011

(65) Prior Publication Data

US 2012/0243787 A1    Sep. 27, 2012

(51) Int. Cl.
*G06K 9/40* (2006.01)
(52) U.S. Cl. .................................................... 382/173
(58) Field of Classification Search .............. 382/171, 382/173, 177, 215, 199, 274
See application file for complete search history.

(56) References Cited

U.S. PATENT DOCUMENTS

| | | | |
|---|---|---|---|
| 5,999,651 A * | 12/1999 | Chang et al. ................. | 382/215 |
| 2002/0031255 A1 | 3/2002 | Kasdan et al. | |
| 2008/0292194 A1 | 11/2008 | Schmidt et al. | |
| 2009/0119296 A1 | 5/2009 | Neogi et al. | |
| 2011/0002520 A1 | 1/2011 | Suehling et al. | |

FOREIGN PATENT DOCUMENTS

WO    2012134568 A1    10/2012

OTHER PUBLICATIONS

International Search Report and Written Opinion received for Patent Application No. PCT/US2011/066676, mailed on Sep. 14, 2012, 9 pages.

* cited by examiner

*Primary Examiner* — Duy M Dang
(74) *Attorney, Agent, or Firm* — Garrett IP, LLC

(57) ABSTRACT

Methods, systems and computer program products to improve the efficiency and computational speed of an image enhancement process. In an embodiment, information that is generated as interim results during feature extraction may be used in a segmentation and classification process and in a content adaptive enhancement process. In particular, a cleaner image that is generated during a noise removal phase of feature extraction may be used in a content adaptive enhancement process. This saves the content adaptive enhancement process from having to generate a cleaner image on its own. In addition, low-level segmentation information that is generated during a neighborhood analysis and cleanup phase of feature extraction may be used in a segmentation and classification process. This saves the segmentation and classification process from having to generate low-level segmentation information on its own.

20 Claims, 9 Drawing Sheets

SYSTEM, METHOD AND COMPUTER PROGRAM PRODUCT FOR DOCUMENT IMAGE ANALYSIS USING FEATURE EXTRACTION FUNCTIONS

BACKGROUND

A common requirement in image processing is the enhancement of the image. To perform image enhancement, current systems may first perform feature detection. This may include the identification of any edges in the image. Once various features have been detected, segmentation of the image may be performed. The segmentation may decompose and classify the image into various components, such as text and different types of graphics, e.g., maps, drawings, photos, and other images. This allows for different treatment of different components of the image; enhancement of text may have to be performed differently than the enhancement of a photo, for example. Enhancement may be performed on the different components, according to the type of component. A variety of enhancement algorithms may be adaptively applied, per component. Ideally, this would achieve improved image quality.

Such processing, however, may include inherent inefficiencies. Feature extraction, for example, may include a noise removal process that results in a cleaner image. Such an image may then be used for purposes of calculation of primitives that are needed to define specific features during the feature extraction process. The enhancement stage may also include the creation of a cleaner image. The creation of a cleaner image during the enhancement process is therefore somewhat redundant, in that a cleaner image was previously generated during the noise removal process of feature extraction.

In addition, feature extraction may include a neighborhood analysis and cleanup phase that creates low-level segmentation information. Such information may typically be used in the extraction of features that may then be passed to the segmentation and classification process. The segmentation and classification process may receive these extracted features for purposes of defining specific detected regions. The segmentation and classification process, however, typically generates low-level segmentation information on its own in order to define detected regions. Again, this may represent a redundancy, given that low-level segmentation information was previously produced during the neighborhood analysis and cleanup phase of the feature extraction process.

BRIEF DESCRIPTION OF THE DRAWINGS/FIGURES

Figure 1:
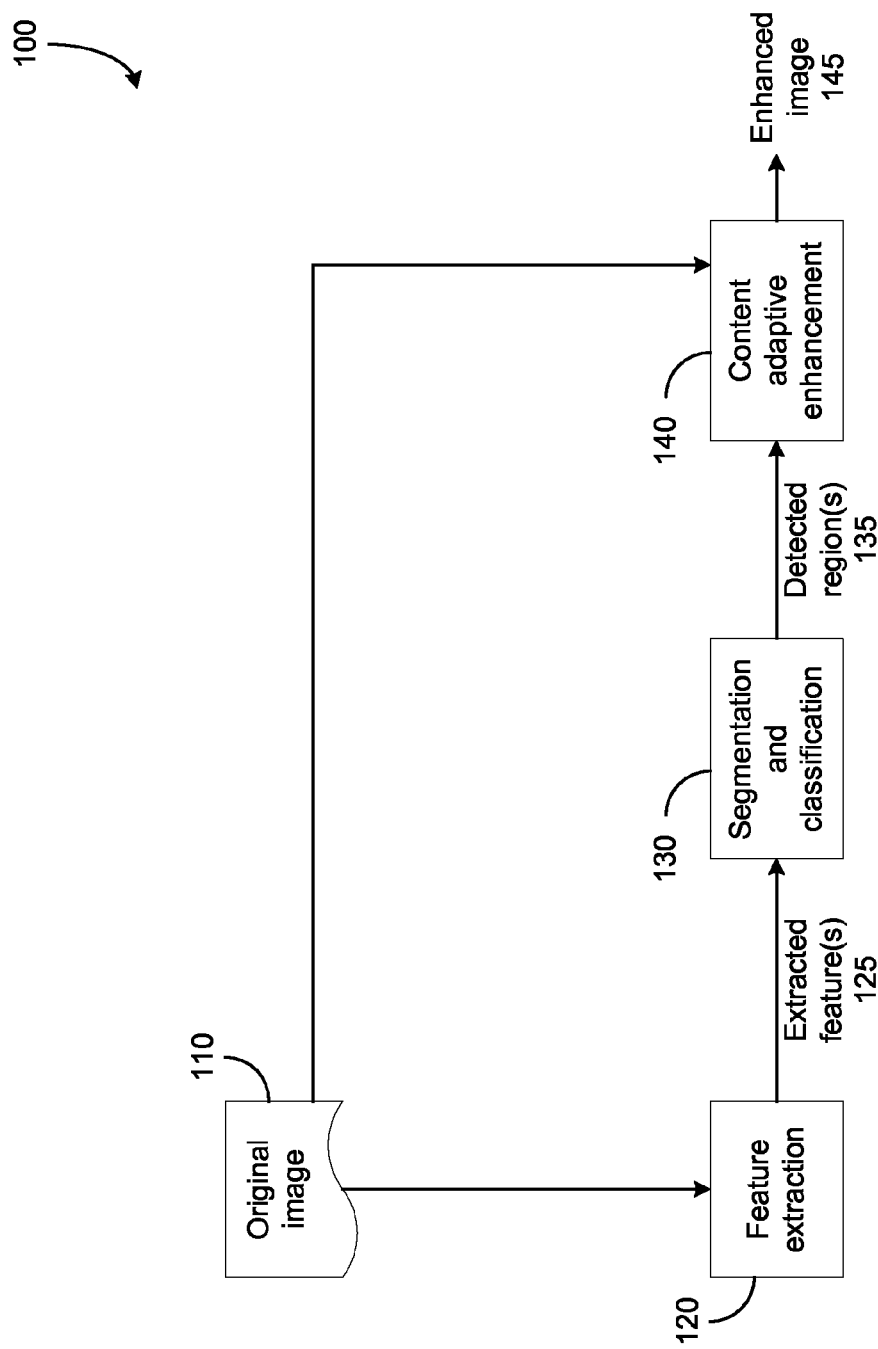
FIG. 1 is a block diagram illustrating image enhancement.

In the drawings, the leftmost digit(s) of a reference number identifies the drawing in which the reference number first appears.

DETAILED DESCRIPTION

An embodiment is now described with reference to the figures, where like reference numbers indicate identical or functionally similar elements. While specific configurations and arrangements are discussed, it should be understood that this is done for illustrative purposes only. A person skilled in the relevant art will recognize that other configurations and arrangements can be used without departing from the spirit and scope of the description. It will be apparent to a person skilled in the relevant art that this can also be employed in a variety of other systems and applications other than what is described herein.

Methods and systems are disclosed herein with the aid of functional building blocks illustrating the functions, features, and relationships thereof. At least some of the boundaries of these functional building blocks have been arbitrarily defined herein for the convenience of the description. Alternate boundaries may be defined so long as the specified functions and relationships thereof are appropriately performed.

Disclosed herein are methods, systems and computer program products to improve the efficiency and computational speed of image enhancement. In an embodiment, information that is generated during feature extraction may be used in a segmentation and classification process and in a content adaptive enhancement process. In particular, a cleaner image that is generated during a noise removal phase of feature extraction may be used in a content adaptive enhancement process. This may save the content adaptive enhancement process from having to generate a cleaner image on its own. In addition, low-level segmentation information that is generated during a neighborhood analysis and cleanup phase of feature extraction may be used in a segmentation and classification process. This may save the segmentation and classification process from having to generate low-level segmentation information on its own.

Figure 2:
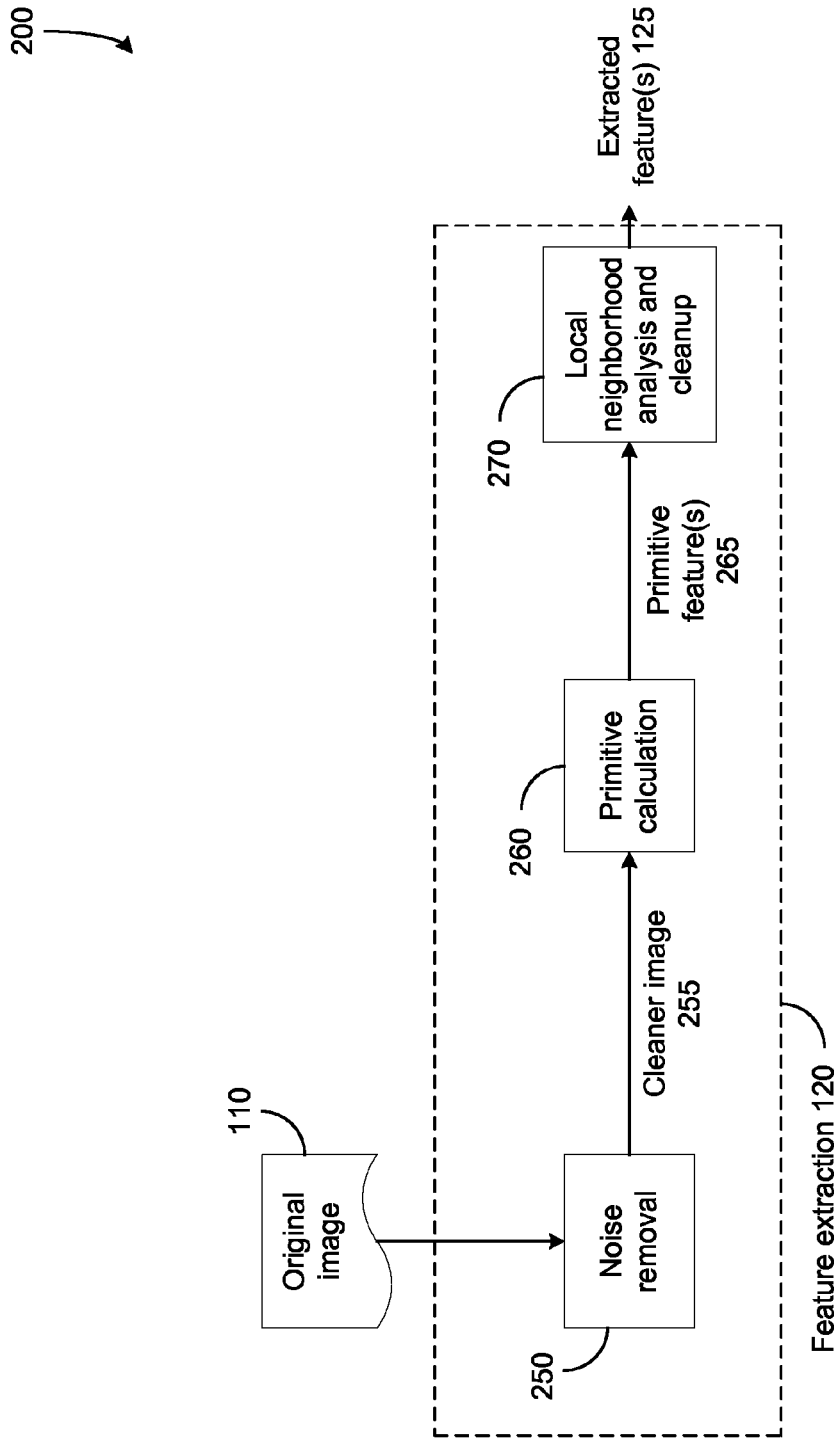
FIG. 2 is a block diagram illustrating feature extraction performed during image enhancement.

Generally, image enhancement may operate as illustrated in FIGS. 1 and 2. As will be described below, the modules shown in the figures may be implemented as software, firmware, hardware, or any combination thereof. In FIG. 1, an original image 110 may first be input to a feature extraction module 120. The original image 110 may be in digital form and encoded in any manner known to a person of ordinary skill in the art. Color may be encoded as red, green, and blue (RGB) coordinates, or encoded using a different coordinate system, for example. The feature extraction module 110 may generate a set of one or more extracted features 125, based on the original image 110. The extracted features 125 may be input into a segmentation and classification module 130.

Based on extracted features 125, this module may produce one or more detected regions 135. The detected regions 135 may then be passed to a content adaptive enhancement module 140. Content adaptive enhancement module 140 may employ one or more different algorithms to the various detected regions 135, depending on the nature of the regions. As would be understood by a person of ordinary skill in the art, a region of text may require one or more algorithms to enhance the appearance of that region, while a region that represents a photograph may require one or more other algorithms to enhance the appearance of the photograph, for example. The output of the content adaptive enhancement module 140 may include an enhanced image 145, produced on the basis of the detected regions 135 and the original image 110.

The feature extraction module 120 is shown in greater detail in FIG. 2. Here, the noise removal may be performed on original image 110 using a noise removal module 250. This may result in a cleaner image 255. This image may be provided to a primitive calculation module 260. As would be understood by a person of ordinary skill in the art, primitive calculation module 260 may calculate the necessary gradients, moments, etc., shown as one or more primitive feature(s) 265. These features may then be used by a local neighborhood analysis and cleanup module 270, to produce the set of extracted features 125.

Figure 3:
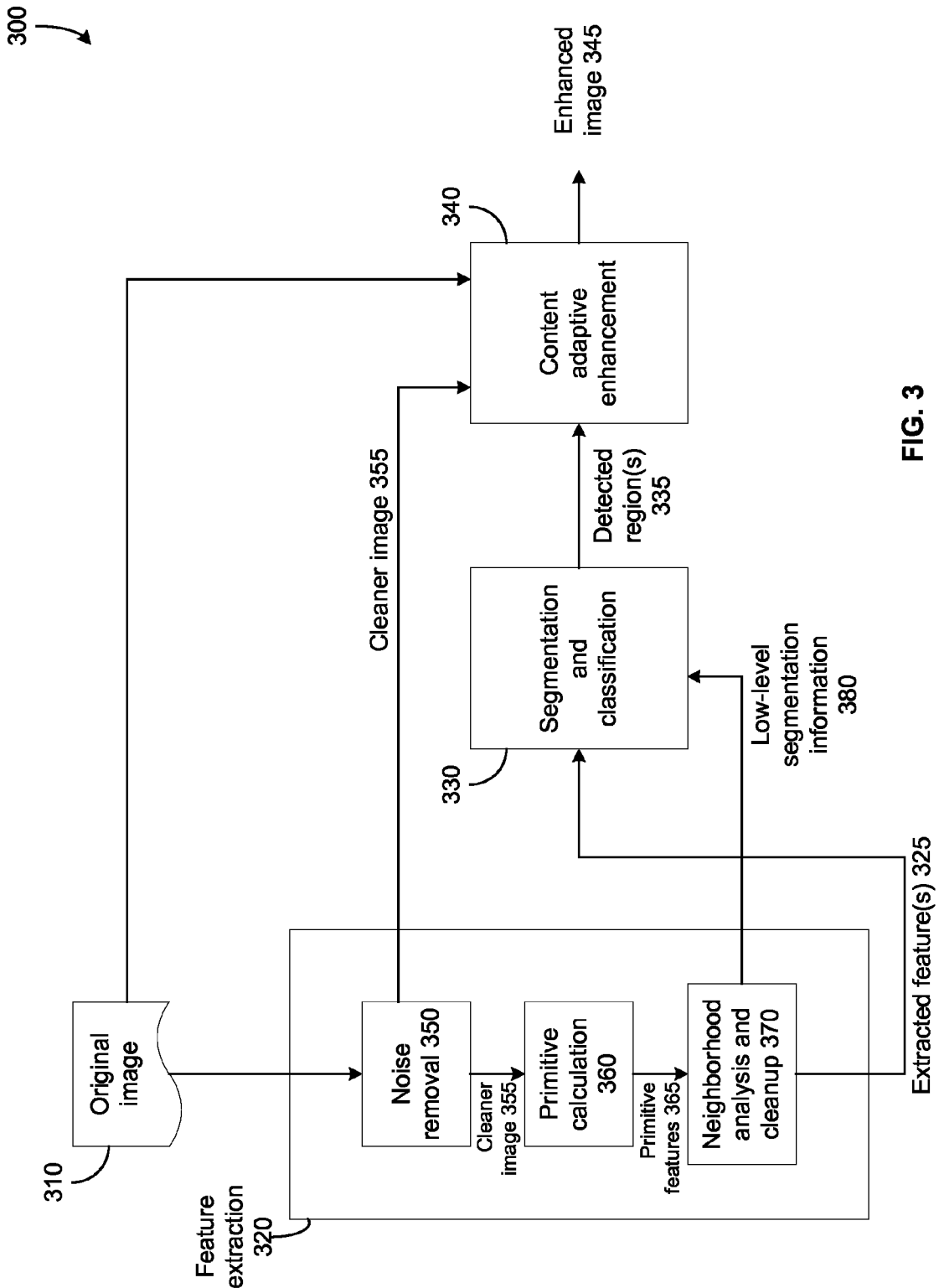
FIG. 3 is a block diagram illustrating the generation and use of a cleaner image and low-level segmentation information, according to an embodiment.

The overall operation of the systems and methods described herein is shown in FIG. 3, according to an embodiment. An original image 310 may first be passed to a feature extraction module 320. In particular, the original image 310 may be used by a noise removal module 350. Noise removal module 350 may generate a cleaner image 355. The cleaner image 355 may then be passed to a primitive calculation module 360. The cleaner image 355 may also be used subsequently by content adaptive enhancement module 340, as will be described below.

The primitive calculation module 360 may use the cleaner image 355 in producing a set of one or more primitive features 365. These features may then be used by a neighborhood analysis and cleanup module 370. During the processing of neighborhood analysis and cleanup module 370, low-level segmentation information 380 may be produced. This segmentation information 380 may be used by neighborhood analysis and cleanup module 370 to produce a set of one or more extracted features 325.

The low-level segmentation information 380 may also be passed to a segmentation and classification module 330, along with the extracted features 325. The segmentation and classification module 330 may use the extracted features 325 and the low-level segmentation information 380 to produce a set of one or more detected regions 335. By receiving low-level segmentation information 380 from the feature extraction module 320, the segmentation and classification module is spared from having to generate its own low-level segmentation information.

The detected regions 335 may then be passed to a content adaptive enhancement module 340. This module may also receive the cleaner image 355 from the noise removal module 350 of feature extraction module 320. The cleaner image 355 may be used, along with the set of detected regions 335 and the original image 310, to produce an enhanced image 345. This saves the content adaptive enhancement module 340 from having to generate its own cleaner image, which it may otherwise have to do in order to generate the enhanced image 345.

Figure 4:
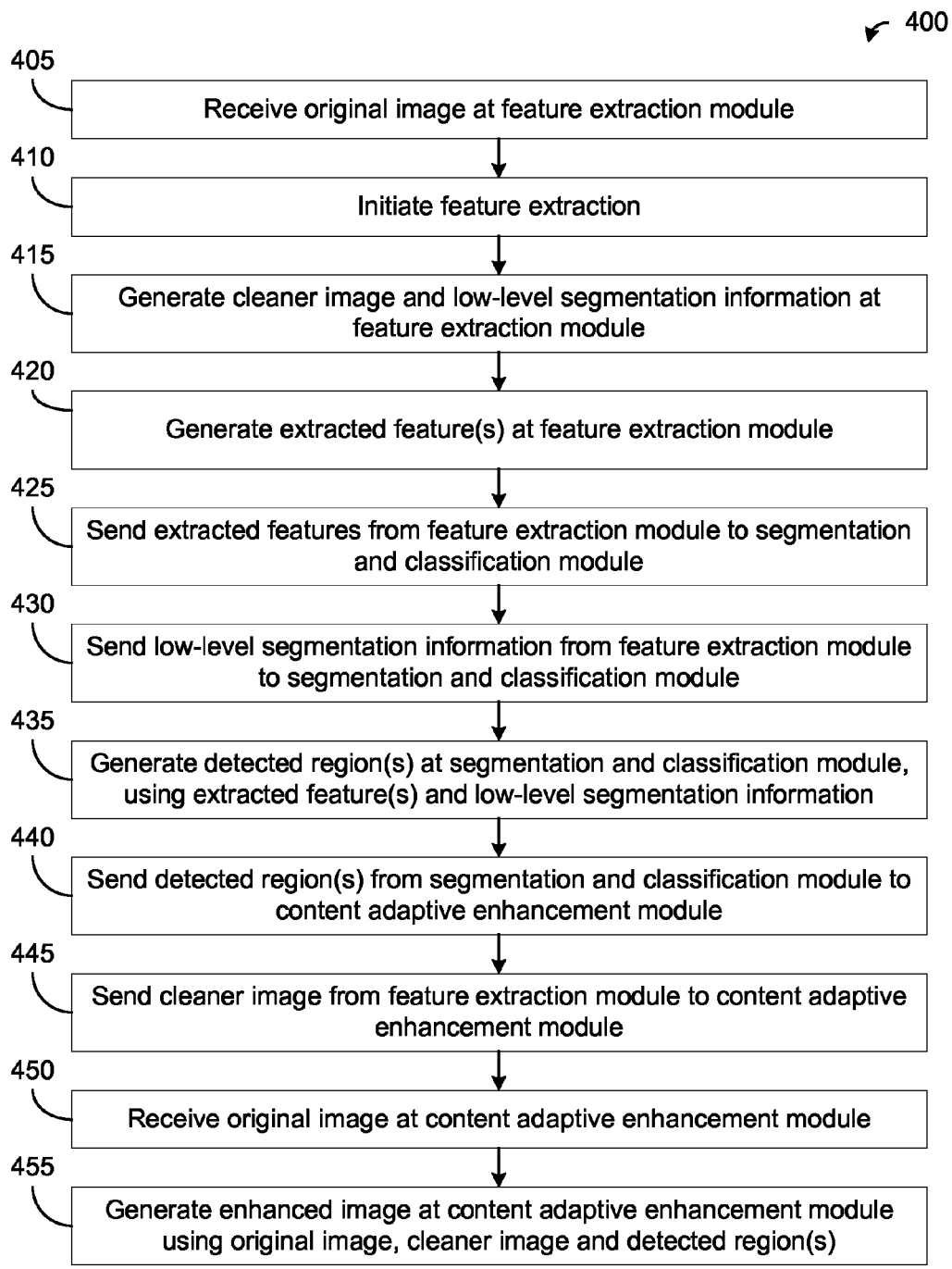
FIG. 4 is a flow chart illustrating the processing of the embodiment of FIG. 3.

The processing of the embodiment of FIG. 3 is illustrated in FIG. 4. At 405, an original image may be received at a feature extraction module. At 410, feature extraction may be initiated. At 415, the feature extraction module may generate a cleaner image and low-level segmentation information, both of which are derived from the original image. At 420, the feature extraction module may produce one or more features extracted from the original image. At 425, the extracted features may be sent from the feature extraction module to a segmentation and classification module. At 430, the low-level segmentation information may be sent from the feature extraction module to the segmentation and classification module. At 435, one or more detected regions may be generated at the segmentation and classification module, using the extracted features and the low-level segmentation information. At 440, the detected regions may be sent from the segmentation and classification module to a content adaptive enhancement module. At 445, the cleaner image may be sent from the feature extraction module to the content adaptive enhancement module. At 450, the original image may be received at the content adaptive enhancement module. At 455, and enhanced image may be generated at the content adaptive enhancement module, using the partial image, the cleaner image, and the detected regions.

Figure 5:
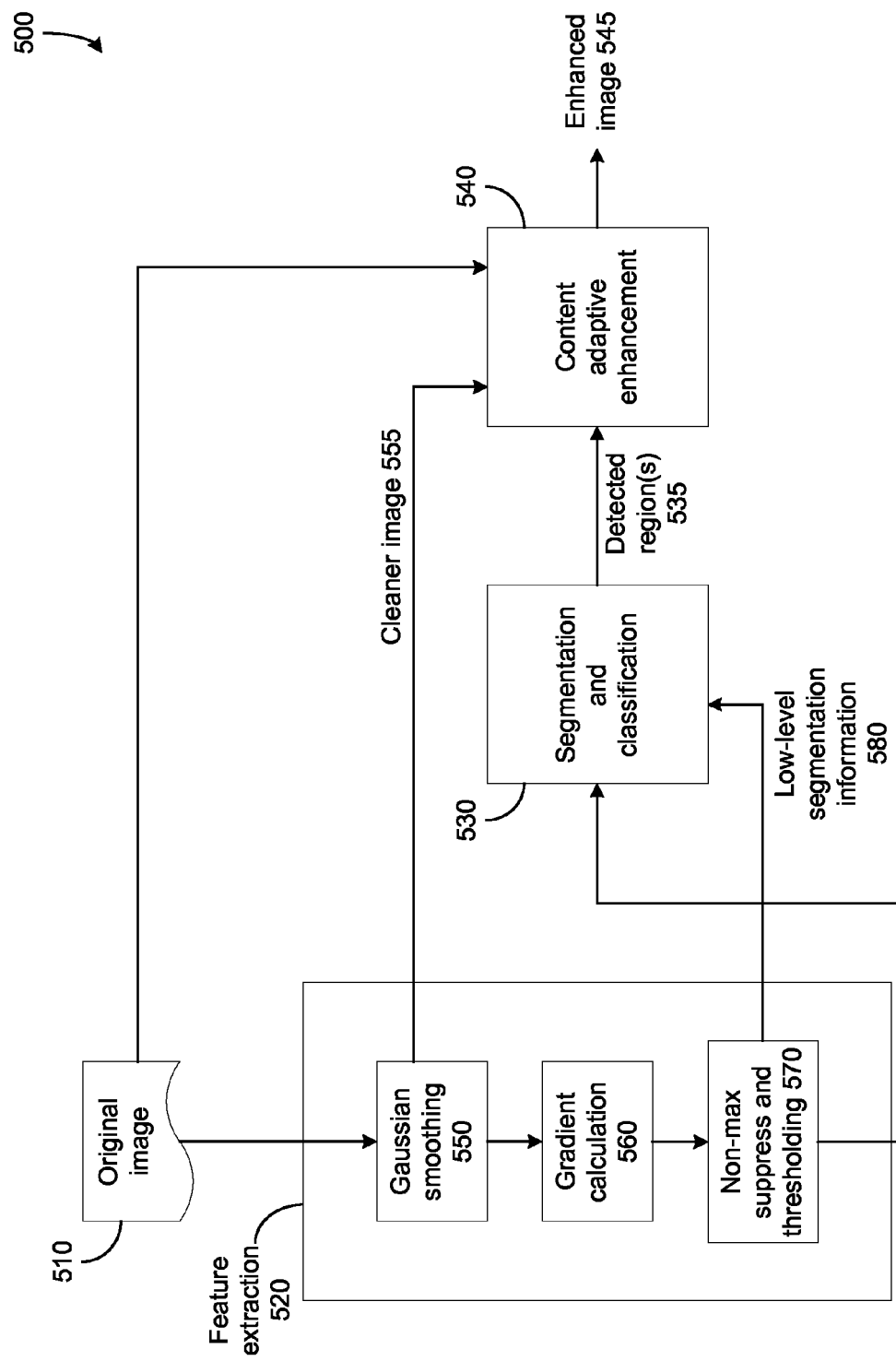
FIG. 5 is a block diagram illustrating the generation and use of a cleaner image and low-level segmentation information in a feature extraction process that uses a canny edge operation, according to an embodiment.

Feature extraction may include a canny edge operator. In an embodiment, such a feature extraction process may be used to provide a cleaner image and low-level segmentation information for subsequent processing during and image enhancement process. This is illustrated in FIG. 5, according to an embodiment. An original image 510 may be input to a feature extraction module 520. In the illustrated embodiment, feature extraction module 520 may include a Gaussian smoothing module 550, a gradient calculation module 560, and a non-max suppress and threshold module 570. The original image 510 may be processed by the Gaussian smoothing module 550. The Gaussian smoothing module 550 may produce a cleaner image 555, based on the original image 510. The cleaner image 555 may be passed to the gradient calculation module 560 and may be subsequently used by a content adaptive enhancement module 540, as will be discussed below.

The output of the Gaussian smoothing module 550 may be sent to the gradient calculation module 560. The output of the gradient calculation module 560 may be sent to the non-max suppress and threshold module 570. This latter module may represent an embodiment of a neighborhood analysis and cleanup module. The output of non-max suppress and threshold module 570 (and of feature extraction module 520) may include one or more extracted features 525, which may be sent to a segmentation and classification module 530. In the course of producing extracted features 525, the non-max suppress and threshold module 570 may also produce low-level segmentation information 580. This information may be used by the segmentation and classification module 530, along with the extracted features 525, to produce one or more detected regions 535. By receiving low-level segmentation information 580, the segmentation and classification module 530 may not have to generate its own low-level segmentation information.

The detected regions 535 may be received at the content adaptive enhancement module 540, along with the cleaner image 555 from the Gaussian smoothing module 550, and the original image 510. Based on at least these three inputs, the content adaptive enhancement module 540 may produce an enhanced image 545. If the cleaner image 555 were not received by the content adaptive enhancement module 540, this module would have to generate a cleaner image on its own in order to produce an enhanced image.

Figure 6:
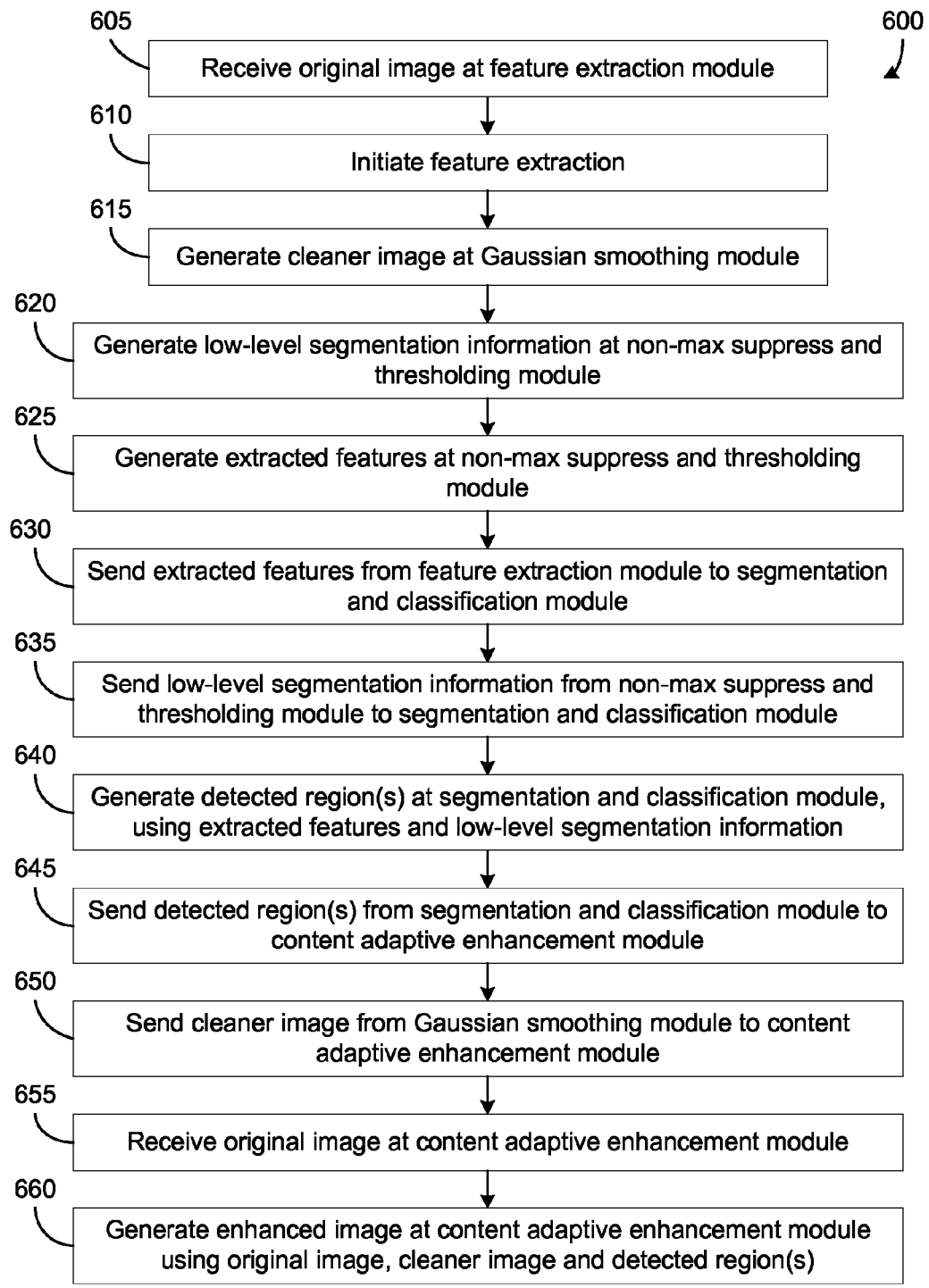
FIG. 6 is a flowchart illustrating the processing of the embodiment of FIG. 5.

The processing of FIG. 5 is illustrated in FIG. 6, according to an embodiment. At 605, the original image may be received at the feature extraction module. At 610, feature extraction may be initiated. At 615, a cleaner image may be generated, based on the original image, at the Gaussian smoothing module in the feature extraction module. At 620, low-level segmentation information may be generated at the non-max suppress and threshold module of the feature extraction module.

At 625, one or more extracted features may be generated at the non-max suppress and thresholding module.

At 630, the extracted features may be sent from the feature extraction module to the segmentation and classification module. At 635, the low-level segmentation information may be sent from the non-max suppress and thresholding module to the segmentation and classification module. At 640, one or more detected regions may be generated at the segmentation and classification module, using the extracted features and the low-level segmentation information. At 645, the detected regions may be sent from the segmentation and classification module to the content adaptive enhancement module. At 650, the cleaner image may be sent from the Gaussian smoothing module of the feature extraction module to the content adaptive enhancement module. At 655, the original image may be received at the content adaptive enhancement module. At 660, an enhanced image may be generated at the content adaptive enhancement module, using at least the original image, the cleaner image, and the detected regions.

Figure 7:
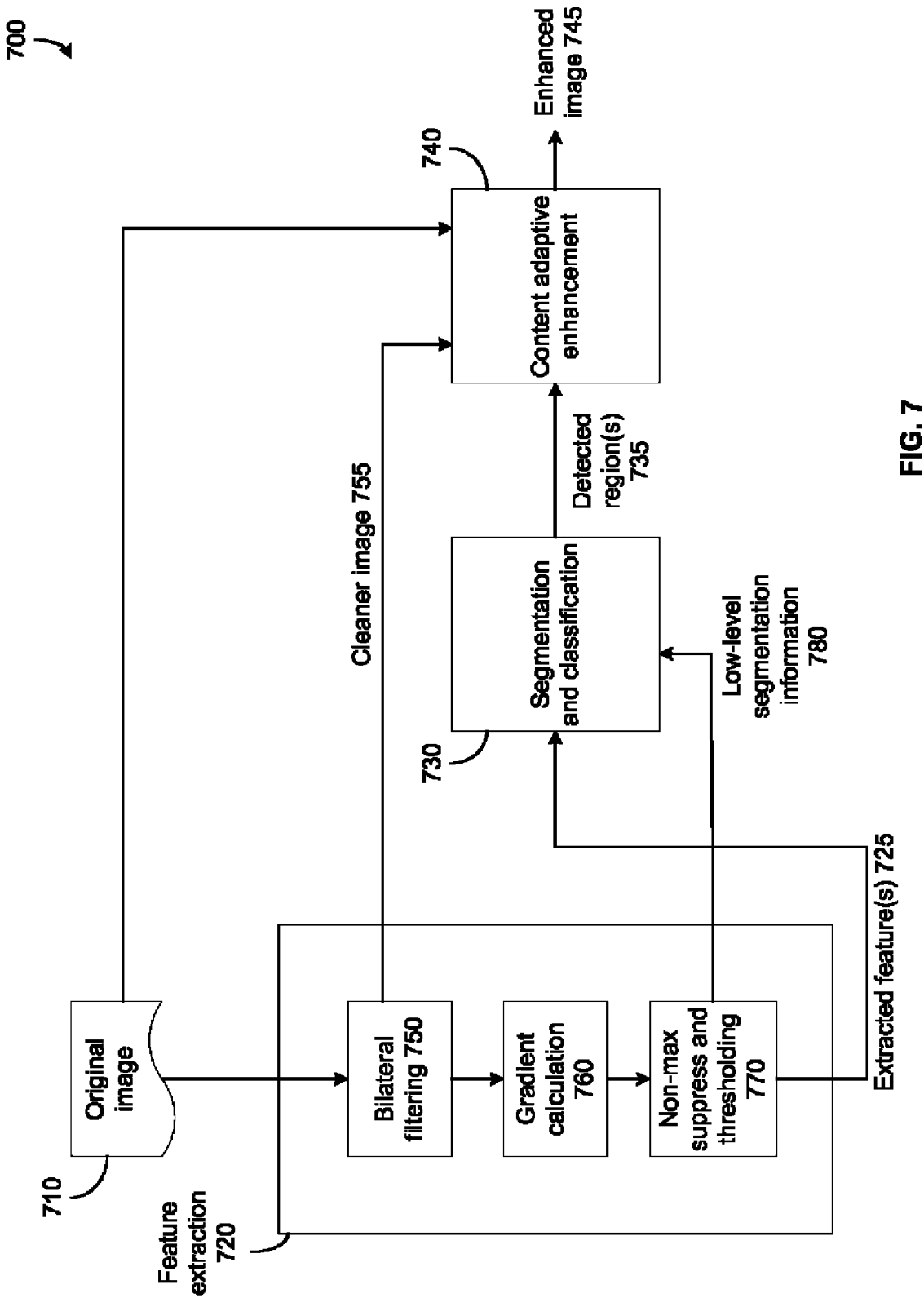
FIG. 7 is a block diagram illustrating the generation and use of a cleaner image and low-level segmentation information in a feature extraction process that uses a bilateral filtering operation, according to an embodiment.

In an alternative embodiment, feature extraction may be based on bilateral filtering, as would be understood by a person of ordinary skill in the art. Such an embodiment is illustrated in FIG. 7. Here, an original image 710 may be passed to a feature extraction module 720. In particular, the original image 710 may be input to a bilateral filtering module 750 in feature extraction module 720. Bilateral filtering module 750 may generate a cleaner image 755, which may be passed to a gradient calculation module 760 in feature extraction module 720, and may also be passed to a content adaptive enhancement module 740.

The output of gradient calculation module 760 may then be passed to a non-max suppress and thresholding module 770. This latter model may generate one or more extracted features 725, which may be passed from feature extraction module 722 to a segmentation and classification module 730. This latter module may represent an embodiment of a neighborhood analysis and cleanup module. Moreover, non-max suppress and thresholding module 770 may also produce low-level segmentation information 780 in the course of generating the extracted features 725. The low-level segmentation information 780 may be sent from the non-max suppress and thresholding module 772 to segmentation and classification module 730, thereby saving the segmentation and classification module 730 from having to generate low-level segmentation information on its own.

Segmentation and classification module 730 may then produce one or more detected regions 735 on the basis of the received extracted features 725 and the low-level segmentation information 780. The detected regions 735 may then be passed to the content adaptive enhancement module 740. This module may also receive the cleaner image 755 from the bilateral filtering module 750, and may also receive the original image 710. Based on at least these inputs, the content adaptive enhancement module 740 may produce an enhanced image 745. Without the cleaner image 755 generated by the bilateral filtering module 750, the content adaptive enhancement module 740 may be required to generate its own cleaner image to be used in producing an enhanced image.

Figure 8:
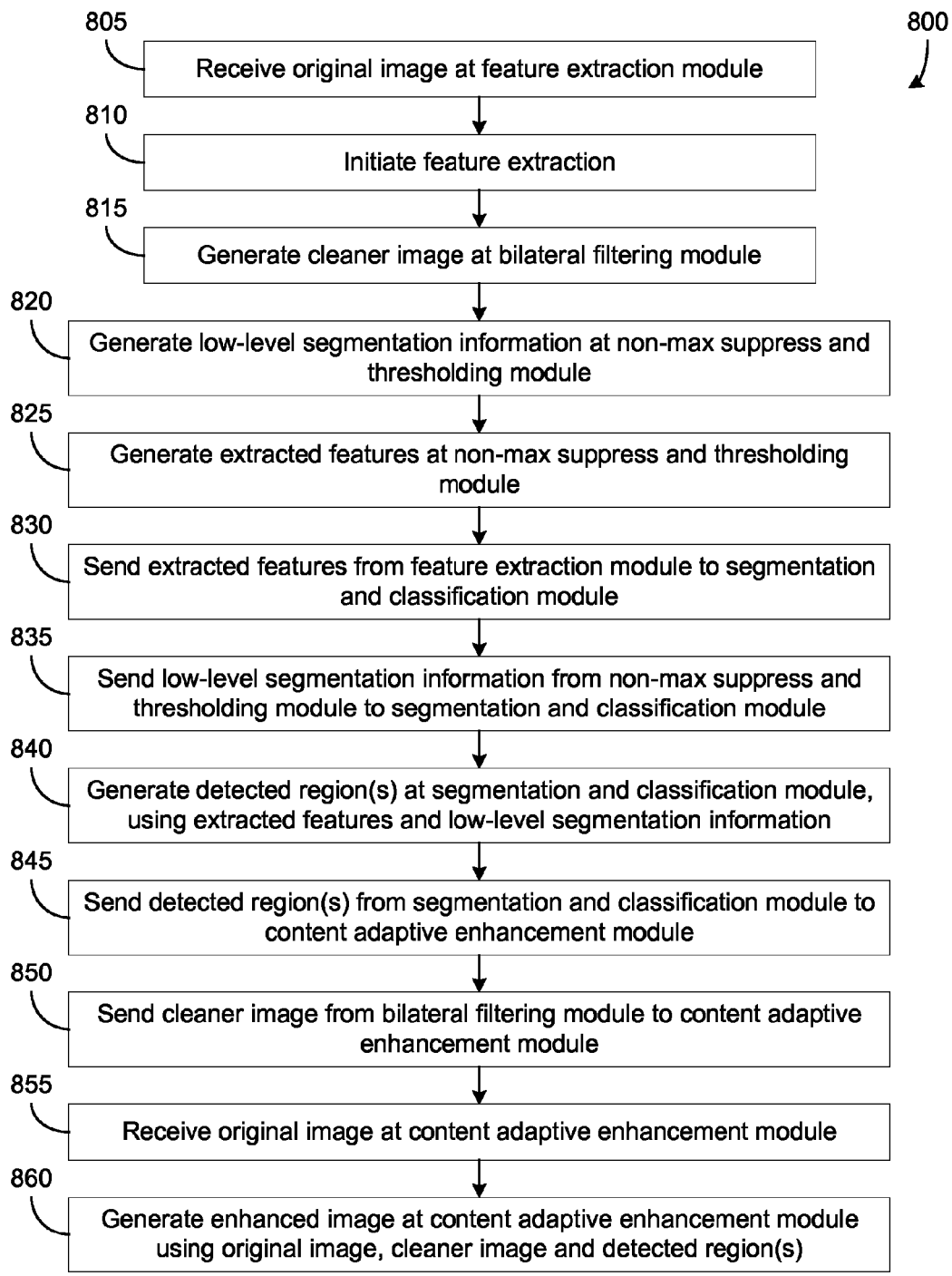
FIG. 8 is a flowchart illustrating the processing of the embodiment of FIG. 7.

The processing of the embodiment of FIG. 7 is illustrated in FIG. 8. At 805, the original image may be received at the feature extraction module. At 810, feature extraction may be initiated. At 815, the cleaner image may be generated at the bilateral filtering module of the feature extraction module. At 820, low-level segmentation information may be generated at the non-max suppress and thresholding module of the feature extraction module. At 825, one or more extracted features may be generated at the non-max suppress and thresholding module.

At 830, the extracted features may be sent from the feature extraction module to the segmentation and classification module. At 835, the low-level segmentation information may be sent from the non-max suppress thresholding module of the feature extraction module to the segmentation and classification module. At 840, one of the more detected regions may be generated at the segmentation and classification module, using the extracted features and low-level segmentation information.

At 845, the detected regions may be sent from the segmentation and classification module to the content adaptive enhancement module. At 850, the cleaner image may be sent from the bilateral filtering module of the feature extraction module to the content adaptive enhancement module. At 855, the content adaptive enhancement module may receive the original image. At 860, the enhanced image is generated at the content adaptive enhancement module, using at least the original image, cleaner image and detected regions.

One or more features disclosed herein, including the modules shown in FIGS. 3, 5, and 7, may be implemented in hardware, software, firmware, or any combination thereof, including discrete and integrated circuit logic, application specific integrated circuit (ASIC) logic, and microcontrollers, and may be implemented as part of a domain-specific integrated circuit package, or a combination of integrated circuit packages. The term software, as used herein, refers to a computer program product including a computer readable medium having computer program logic stored therein to cause a computer system to perform one or more features and/or combinations of features disclosed herein.

Figure 9:
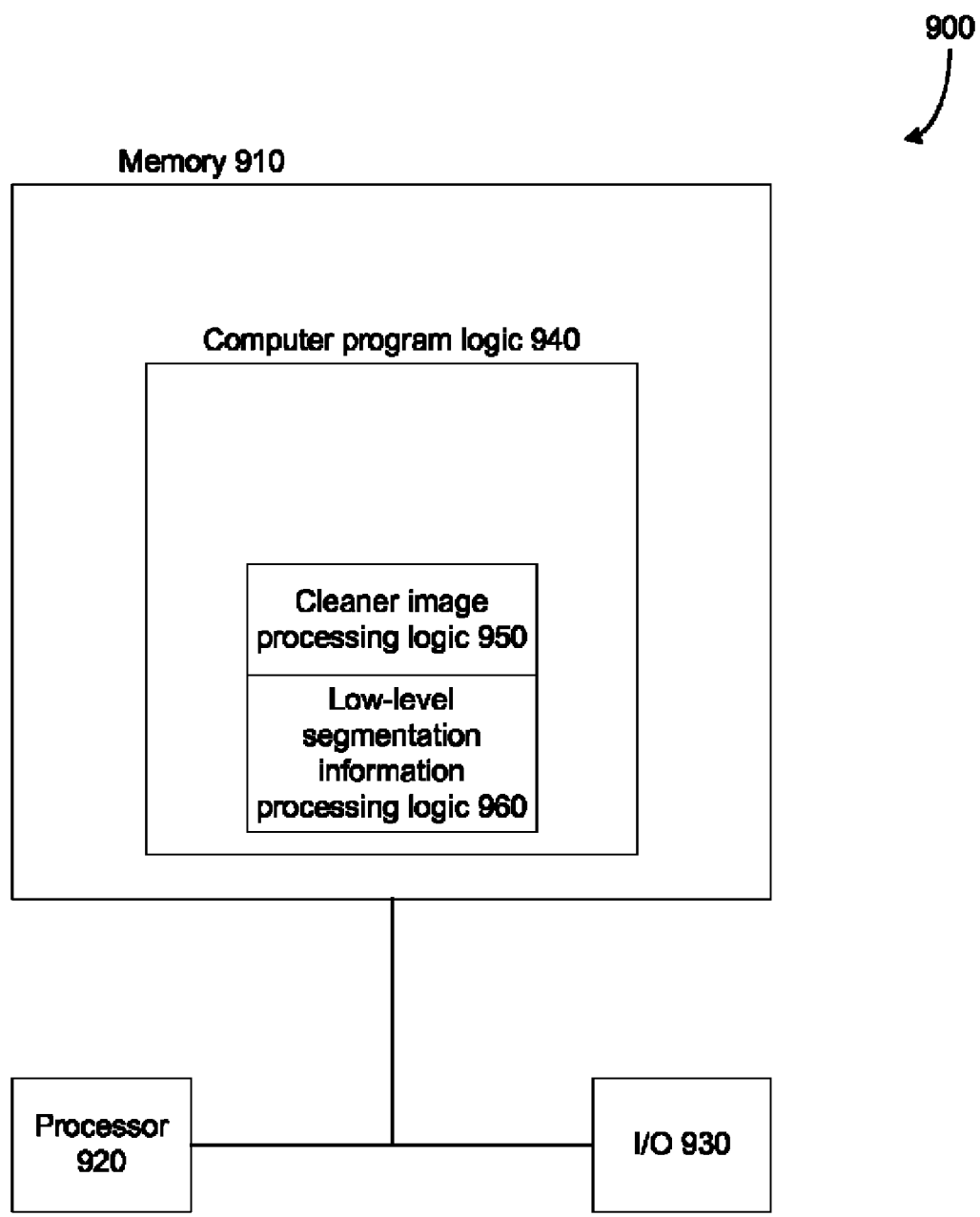
FIG. 9 is a block diagram illustrating a software or firmware embodiment.

A software or firmware embodiment of the processing described above is illustrated in FIG. 9. System 900 may include a programmable processor 920 and a body of memory 910 that may include one or more computer readable media that store computer program logic 940. Memory 910 may be implemented as one or more of a hard disk and drive, a removable media such as a compact disk and drive, flash memory, or a random access (RAM) or read-only memory (ROM) device, for example. Processor 920 and memory 910 may be in communication using any of several technologies known to one of ordinary skill in the art, such as a bus. Processor 920 may be a special purpose graphics processor or a general purpose processor being used as a graphics processor. Logic contained in memory 910 may be read and executed by processor 920. One or more I/O ports and/or I/O devices, shown collectively as I/O 930, may also be connected to processor 920 and memory 910.

In an embodiment, computer program logic 940 may include the logic modules 950 and 960. Cleaner image processing logic 950 may be part of a content adaptive enhancement module, and may be responsible for receiving, at the content adaptive enhancement module, the cleaner image from a noise removal module in a feature extraction module. Cleaner image processing module 950 may also be responsible for utilizing the received cleaner image in generating an enhanced image.

Low-level segmentation information processing logic 960 may be part of a segmentation and classification module, and may be responsible for receiving, at the segmentation and classification module, low-level segmentation information from a neighborhood analysis and cleanup module in the feature extraction module. Low-level segmentation information processing logic 960 may also be responsible for utilizing the low-level segmentation information in generating the detected regions.

While various embodiments are disclosed herein, it should be understood that they have been presented by way of example only, and not limitation. It will be apparent to persons skilled in the relevant art that various changes in form and detail may be made therein without departing from the spirit and scope of the methods and systems disclosed herein. Thus, the breadth and scope of the claims should not be limited by any of the exemplary embodiments disclosed herein.

What is claimed is:

1. A method, comprising:
    extracting features from an original image;
    performing segmentation and classification on the extracted features to generate detected regions;
    performing content adaptive enhancement of the original image, using the detected regions, to generate an enhanced image,
    wherein
        said content adaptive enhancement is performed using a cleaner image as an input, the cleaner image generated during said feature extraction, and
        said segmentation and classification are performed using low-level segmentation information as an input, the low-level segmentation information generated during said feature extraction.

2. The method of claim 1, wherein said feature extraction comprises noise removal, wherein said noise removal generates the cleaner image.

3. The method of claim 1, wherein said feature extraction comprises a neighborhood analysis and cleanup process, wherein said neighborhood analysis and cleanup process generates the low-level segmentation information.

4. The method of claim 1, wherein said feature extraction comprises a canny edge operation.

5. The method of claim 4, wherein said feature extraction comprises:
    a Gaussian smoothing process that generates the cleaner image; and
    a non-max suppress and threshold and process that generates the low-level segmentation information.

6. The method of claim 1, wherein said feature extraction comprises bilateral filter-based feature detection.

7. The method of claim 6, wherein said feature extraction comprises:
    a bilateral filtering operation that generates the cleaner image; and
    a non-max suppress and threshold and operation that generates the low-level segmentation information.

8. A system, comprising:
    a processor; and
    a memory in communication with said processor, wherein said memory stores a plurality of processing instructions configured to direct said processor to
    extract features from an original image;
    perform segmentation and classification on the extracted features to generate detected regions;
    perform content adaptive enhancement of the original image, using the detected regions, to generate an enhanced image,
    wherein
        said content adaptive enhancement is performed using a cleaner image as an input, the cleaner image generated during said feature extraction, and
        said segmentation and classification are performed using low-level segmentation information as an input, the low-level segmentation information generated during said feature extraction.

9. The system of claim 8, wherein said instructions configured to direct said processor to extract features comprises instructions configured to direct said processor to perform noise removal, wherein the noise removal generates the cleaner image.

10. The system of claim 8, wherein said instructions configured to direct said processor to extract features comprises instructions configured to direct said processor to perform neighborhood analysis and cleanup, wherein the neighborhood analysis and cleanup process generates the low-level segmentation information.

11. The system of claim 8, wherein said instructions configured to direct said processor to extract features comprises instructions configured to direct said processor to perform a canny edge operation.

12. The system of claim 11, wherein said instructions configured to direct said processor to extract features comprises instructions configured to direct said processor to:
    perform a Gaussian smoothing process that generates the cleaner image; and
    perform a non-max suppress and threshold and process that generates the low-level segmentation information.

13. The system of claim 8, wherein said instructions configured to direct said processor to extract features comprises instructions configured to direct said processor to
    perform a bilateral filtering operation that generates the cleaner image; and
    perform a non-max suppress and threshold and operation that generates the low-level segmentation information.

14. A computer program product including a non-transitory computer readable medium having computer program logic stored therein, the computer program logic comprising:
    logic to cause a processor to extract features from an original image;
    logic to cause the processor to perform segmentation and classification on the extracted features to generate detected regions; and
    logic to cause the processor to perform content adaptive enhancement of the original image, using the detected regions, to generate an enhanced image,
    wherein
        the content adaptive enhancement is performed using a cleaner image as an input, the cleaner image generated during the feature extraction, and
        the segmentation and classification are performed using low-level segmentation information as an input, the low-level segmentation information generated during the feature extraction.

15. The computer program product of claim 14, wherein said logic to cause the processor to extract features comprises logic to cause the processor to perform noise removal, wherein the noise removal generates the cleaner image.

16. The computer program product of claim 14, wherein said logic to cause the processor to extract features comprises logic to cause the processor to perform neighborhood analysis and cleanup, wherein the neighborhood analysis and cleanup process generates the low-level segmentation information.

17. The computer program product of claim 14, wherein said logic to cause the processor to extract features comprises logic to cause the processor to perform a canny edge operation.

18. The computer program product of claim 17, wherein said logic to cause the processor to extract features comprises:
   logic to cause the processor to perform a Gaussian smoothing process that generates the cleaner image; and
   logic to cause the processor to perform a non-max suppress and threshold and process that generates the low-level segmentation information.

19. The computer program product of claim 14, wherein said logic to cause the processor to extract features comprises logic to cause the processor to perform bilateral filter-based feature detection.

20. The computer program product of claim 19, wherein said logic to cause the processor to extract features comprises:
   logic to cause the processor to perform a bilateral filtering operation that generates the cleaner image; and
   logic to cause the processor to perform a non-max suppress and threshold and operation that generates the low-level segmentation information.

* * * * *